(12) United States Patent
Kang

(10) Patent No.: US 7,942,541 B2
(45) Date of Patent: May 17, 2011

(54) LIGHT GUIDE, IMAGE DISPLAY DEVICE AND METHOD FOR GENERATING IMAGE

(75) Inventor: Hoon Kang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 1194 days.

(21) Appl. No.: 11/635,584

(22) Filed: Dec. 8, 2006

(65) Prior Publication Data

US 2007/0296877 A1 Dec. 27, 2007

(30) Foreign Application Priority Data

Jun. 26, 2006 (KR) ........................ 10-2006-0057611

(51) Int. Cl.
*G02F 1/335* (2006.01)

(52) U.S. Cl. ....... 362/97.1; 362/610; 362/615; 362/626; 362/620; 349/15

(58) Field of Classification Search .................. 362/610, 362/615, 520, 626, 606, 619, 609; 349/15, 349/49, 69
See application file for complete search history.

(56) References Cited

U.S. PATENT DOCUMENTS

| | | | | |
|---|---|---|---|---|
| 6,129,439 A | * | 10/2000 | Hou et al. | 362/626 |
| 6,290,364 B1 | * | 9/2001 | Koike et al. | 362/620 |
| 6,799,859 B1 | * | 10/2004 | Ida et al. | 362/26 |
| 7,722,238 B2 | * | 5/2010 | Uehara et al. | 362/606 |
| 2005/0180719 A1 | | 8/2005 | Hara et al. | |

FOREIGN PATENT DOCUMENTS

| | | |
|---|---|---|
| CN | 1299564 | 6/2001 |
| CN | 1617014 | 5/2005 |

\* cited by examiner

*Primary Examiner* — Anabel M Ton
(74) *Attorney, Agent, or Firm* — McKenna Long & Aldridge LLP

(57) ABSTRACT

A light guide including a transparent substrate; a plurality of guide members formed on a first surface of a transparent substrate, the guides have guide bases separated by an open area on the first surface of the transparent substrate having a width "a", and the guide bases overlapping an area on the first surface of the transparent substrate having a width "b", facing sides of adjacent guides each forming an obtuse angle with the first surface of the transparent substrate and, wherein the ratio "b" divided by "a" is substantially equal to N where N is an integer greater than 2 a transparent substrate having an incidence surface and a transmitting surface; and a plurality of guides each formed on the incidence surface of the transparent substrate and each guide having opposing side surfaces each forming an angle with the incidence surface.

18 Claims, 6 Drawing Sheets

LIGHT GUIDE, IMAGE DISPLAY DEVICE AND METHOD FOR GENERATING IMAGE

This application claims the benefit of Korean Patent Application No. P2006-057611, filed on Jun. 26, 2006, which is hereby incorporated by reference for all purposes as if fully set forth herein.

BACKGROUND OF THE INVENTION

1. Field of the Invention

The present invention relates to a three-dimensional image display device, and more particularly to a light guide, an image display device and a method for generating image.

2. Discussion of the Related Art

A three-dimensional image display device displays a three-dimensional image by use of the principle that perspective is perceived when image signals which are different from each other are perceived separately by each of a viewer's two eyes. Three-dimensional image display devices can be generally classified according to their operating method as devices employing a stereoscopic method, a volumetric method, holographic method, among others.

Among the three-dimensional image display devices employing stereoscopic methods and which do not require special glasses are the parallax barrier type and a lenticular type. These device types have been actively researched and are in common use.

The parallax barrier type three-dimensional image display device, as shown in FIG. 1, selectively shields the light irradiated from a display device 11 by use of a parallax barrier 12 to divide an image from the display device into a left eye picture and a right eye picture, thereby realizing a three-dimensional image.

The locations of parallax barrier 12 and the display device 11 can be changed in the three-dimensional display device. The parallax barrier type liquid crystal display device has a disadvantage of having a relatively high brightness loss because the intensity of the light transmitted from the parallax barrier 12 is reduced to below 50% of that of the incident light.

The lenticular lens type three-dimensional image display device, as shown in FIG. 2, separates the image from the display device into a right eye picture and a left eye picture with a lenticular lens 21, thereby realizing the three-dimensional image.

SUMMARY OF THE INVENTION

Accordingly, the present invention is directed to a light guide, a image display device and a method for generating image that substantially obviates one or more of the problems due to limitations and disadvantages of the related art.

An advantage of the present invention to provide a light guide that is adaptive for minimizing brightness loss, and a three-dimensional image display device using the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a light guide according to an aspect of the present invention includes a transparent substrate; a plurality of guide members each having a guide base formed on a first surface of a transparent substrate, the guide bases being separated by an open area on the first surface of the transparent substrate having a width "a", and each guide base overlapping an area on the first surface of the transparent substrate having a width "b", wherein facing sides of adjacent guides each form an obtuse angle with the first surface of the transparent substrate and, wherein the ratio "b" divided by "a" is substantially equal to N where N is an integer greater than 2.

In another aspect of the present invention, a three-dimensional image display device includes a display unit for displaying images; a backlight unit; and an optical guide including: a transparent substrate; a plurality of guide members each having a guide base formed on a first surface of a transparent substrate, the guide bases separated by an open area on the first surface of the first surface having a width "a" along, and each guide base overlapping an area on the first surface of the transparent substrate having a width "b", wherein facing sides of adjacent guides each form an obtuse plane angle with the first surface of the transparent substrate, and wherein the ratio A divided by a is substantially equal to N where N is an integer greater than 2.

In another aspect of the present invention, a method for generating images includes: providing a multiple image display device, including: a backlight unit; and a plurality of guide members each having a guide base formed on a first surface of a transparent substrate, the guide bases being separated by an open area on the first surface of the transparent substrate having a width "a", and each guide base overlapping an area on the first surface of the transparent substrate having a width "b", wherein facing sides of adjacent guides each form an obtuse angle with the first surface of the transparent substrate and, wherein the ratio "b" divided by "a" is substantially equal to N where N is an integer greater than 2; driving image pixels of a display with image data for multiple images using an image pitch of N; reflecting light emitted the backlight unit from a guide member of the plurality of guide members onto the incidence surface of the parallax barrier; and directing the reflected light onto the display device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, examples of which are illustrated in the accompanying drawings.

Figure 1:
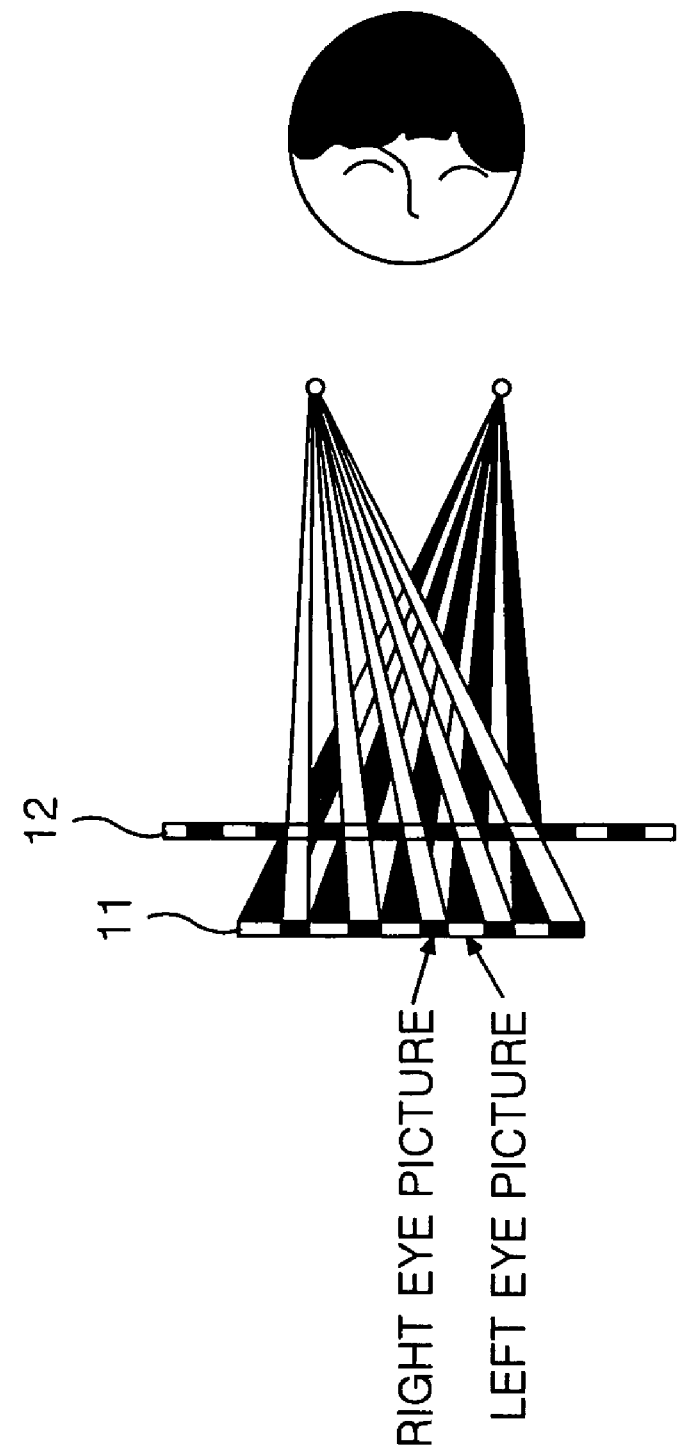
FIG. 1 is a view schematically illustrating a three-dimensional image display device of the related art using a parallax barrier.
Figure 2:
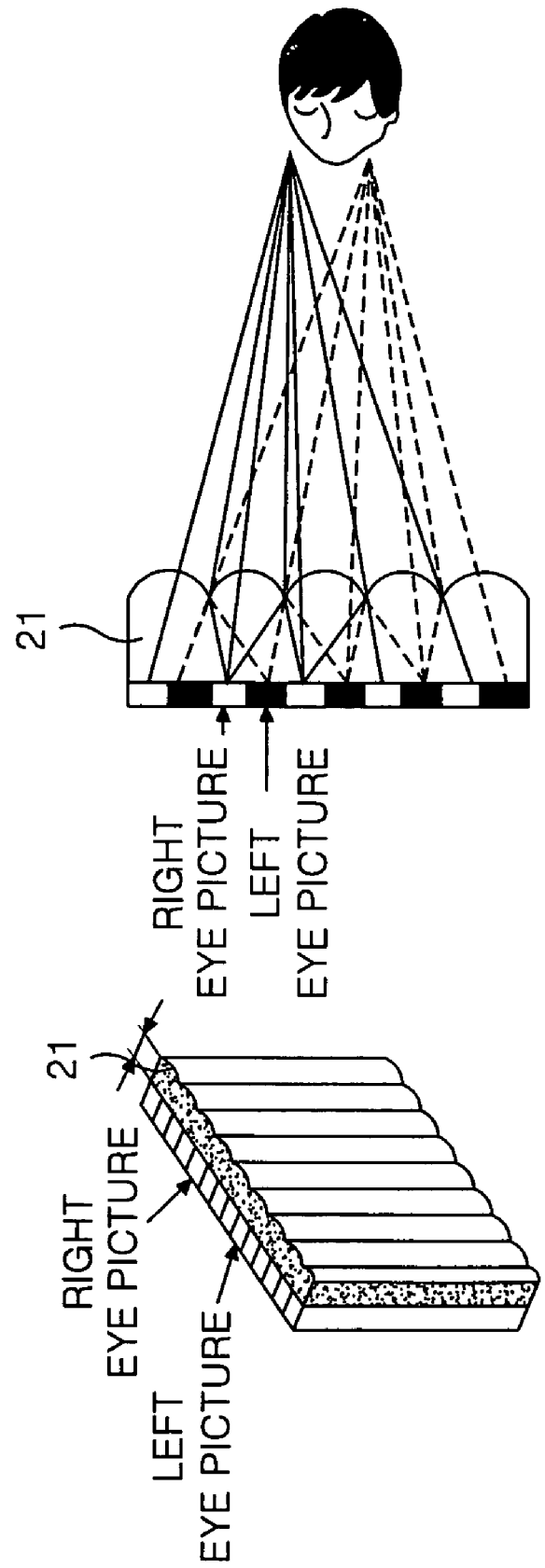
FIG. 2 is a view illustrating a three-dimensional image display device of the related art using a lenticular lens.
Figure 3:
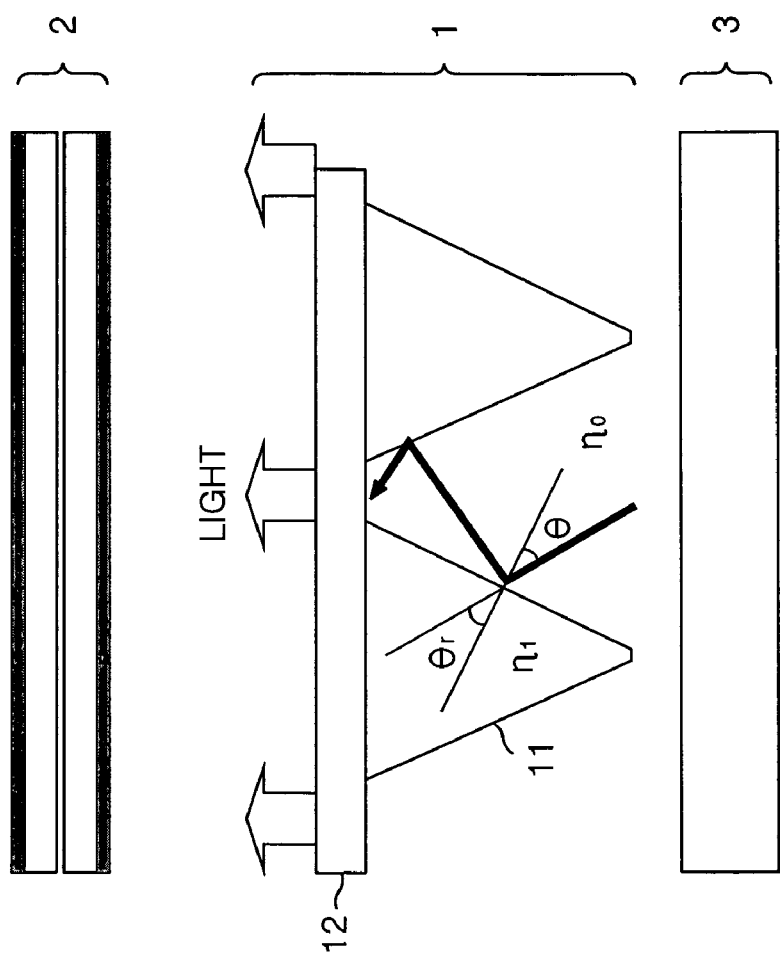
FIG. 3 is a cross sectional view illustrating a three-dimensional image, display device according to an embodiment of the present invention.
Figure 4:
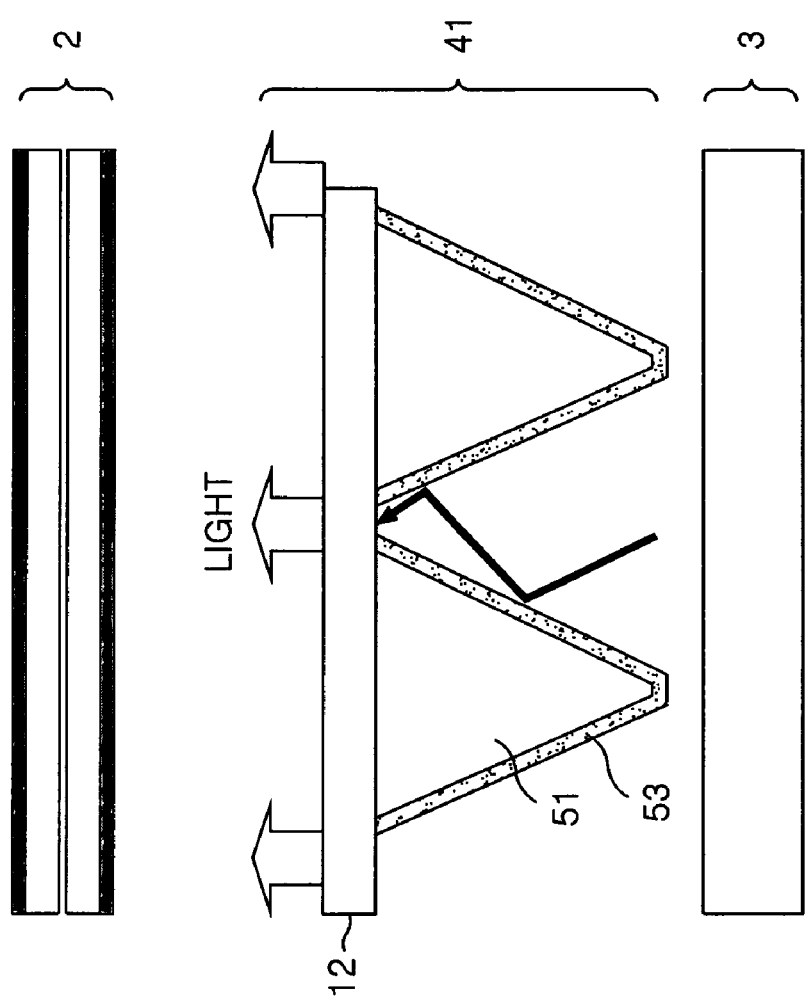
FIG. 4 is a cross sectional view illustrating a three-dimensional image display device according to another embodiment of the present invention.

With reference to FIGS. 3 to 4, embodiments of the present invention will be explained as follows.

As shown in FIG. 3, a three-dimensional image display device according to a first embodiment of the present invention includes a parallax barrier 1 disposed between a liquid crystal display device 2 and a backlight unit 3.

The liquid crystal display device 2 has a lower substrate on which a plurality of data lines cross a plurality of scan lines, and liquid crystal cells which are arranged in an active matrix shape and an upper substrate on which a color filter and a black matrix are formed. Further, a common electrode and pixel electrodes for applying electric field to each of liquid crystal cells are formed in the liquid crystal display panel. Thin film transistors (hereinafter, referred to as 'TFTs') are formed at the crossing parts of the data lines and the gate lines for switching a data voltage which is to be applied to the pixel electrode in response to a scan signal. The liquid crystal display device 2 electrically controls the orientation of liquid crystal molecules in the liquid crystal cells to control the amount of the transmitted through the liquid crystal device from the parallax barrier 1, thereby displaying the three-dimensional image. The liquid crystal display device 2 alternately displays the left eye image and the right eye image by the unit of pixel to display the three-dimensional image.

The backlight unit 3 uniformly irradiates light onto the parallax barrier 1.

The parallax barrier 1 includes a transparent substrate 12 having flat front and rear surfaces; and a guide 11 projected towards the backlight unit 3 from the transparent substrate 12. The transparent substrate 12 and the guide 11 maybe made from a transparent polymeric material such as acryl.

The guide 11 reflects the light from the backlight unit 3 to guide the reflected light to the liquid crystal display device 2. To this end, facing side surfaces of the guide 11 are formed to have an inclined or angled surface having a pre-determined tilt angle so that a total reflection condition is established for most of the light incident from the backlight. That is to say, the guide 11 has the both side surfaces inclined or angled such that that the width of the guide narrows in the direction towards the backlight unit 3. A total reflection angle θ which is the angle between the path of the incident light and a perpendicular to the inclined surface of the guide 11 at or above which total reflection of the incident light occurs can be obtained by Snell's Law, as in Mathematical Formula 1 and 2.

$$n_0 \sin\Theta = n_1 \sin\theta_r = n_1 \sin(\pi/2) \quad \text{[Mathematical Formula 1]}$$

$$\Theta = \sin^{-1} n_1 \quad \text{[Mathematical Formula 2]}$$

In the above formulae, 'n0' is the refractive index of the air layer between the parallax barrier 1 and the backlight unit 3, 'θ' is an incidence angle of the incident light, and 'n1' is the refractive index of the guide 11, and θr is the angle between the refracted light within the guide 11 and a line perpendicular to the guide surface.

The refractive index n1 of the guide 11 is higher than the refractive index n0 of the air layer.

As can be appreciated from FIG. 3 and by using Mathematical Formula 1, if 'θr' is π/2 (or 90 degrees) or larger, the incident light will be totally reflected at the inclined surface of the guide. Further, if the refractive index of the air is 1, the angle θ between the incident light and a line perpendicular to the inclined surface of the guide 11 is as shown in Mathematical Formula 2, and the incident light is totally reflected at the guide 11 if θ>θr.

The transparent substrate 12 and the guide 11 of the parallax barrier 1 can be easily made by molding.

The guides 11 are separated by a designated distance. Accordingly, a flat light incidence surface of the transparent substrate 12 is exposed between the guides 11, and the light totally reflected by the guides 11 progresses to the liquid crystal display device 2 through the flat light incidence surface, the medium of the transparent substrate 12, and the flat transmitting surface. To achieve the total reflection condition with a guide attached to a flat surface, the reflecting surface of the guide will form an obtuse angle with the flat surface.

FIG. 4 represents a three-dimensional image display device according to a second embodiment of the present invention. In FIG. 4, the components which are substantially the same as those of the foregoing first embodiment will be given the same reference numerals, and a detailed description for these components will be omitted.

Referring to FIG. 4, the three-dimensional image display device according to the second embodiment of the present invention includes a parallax barrier 41 disposed between a liquid crystal display device 2 and a backlight unit 3.

The parallax barrier 41 includes a transparent substrate 12 having flat front and rear surfaces; and a guide 51 disposed on a surface of the parallax barrier opposite the backlight unit and projecting towards the backlight unit 3 from the transparent substrate 12. A reflection layer 53 is disposed or coated on side surfaces of the guide.

The parallax barrier 41, similarly to the foregoing embodiment includes a guide 51 is formed having opposing sides angled so that the width of the guide narrows as it projects from the transparent substrate 12 towards guide may have a triangular cross section (with edges of the opposing sides forming opposite sides of the triangle) widest at the transparent substrate and tapering in a direction towards the backlight. The guide 51 and the transparent substrate 12 may be formed together by molding a transparent polymer material.

The reflection layer 53 may be formed on the inclined surface of the guide 51 by coating a reflective material onto the surface using a known coating method and acts to reflect the light incident from the backlight unit 3 and to guide to the liquid crystal display device 2. Most of light generated from the backlight unit 3 can be directed onto the liquid crystal display device 2 by the reflection layer 53.

Figure 5:
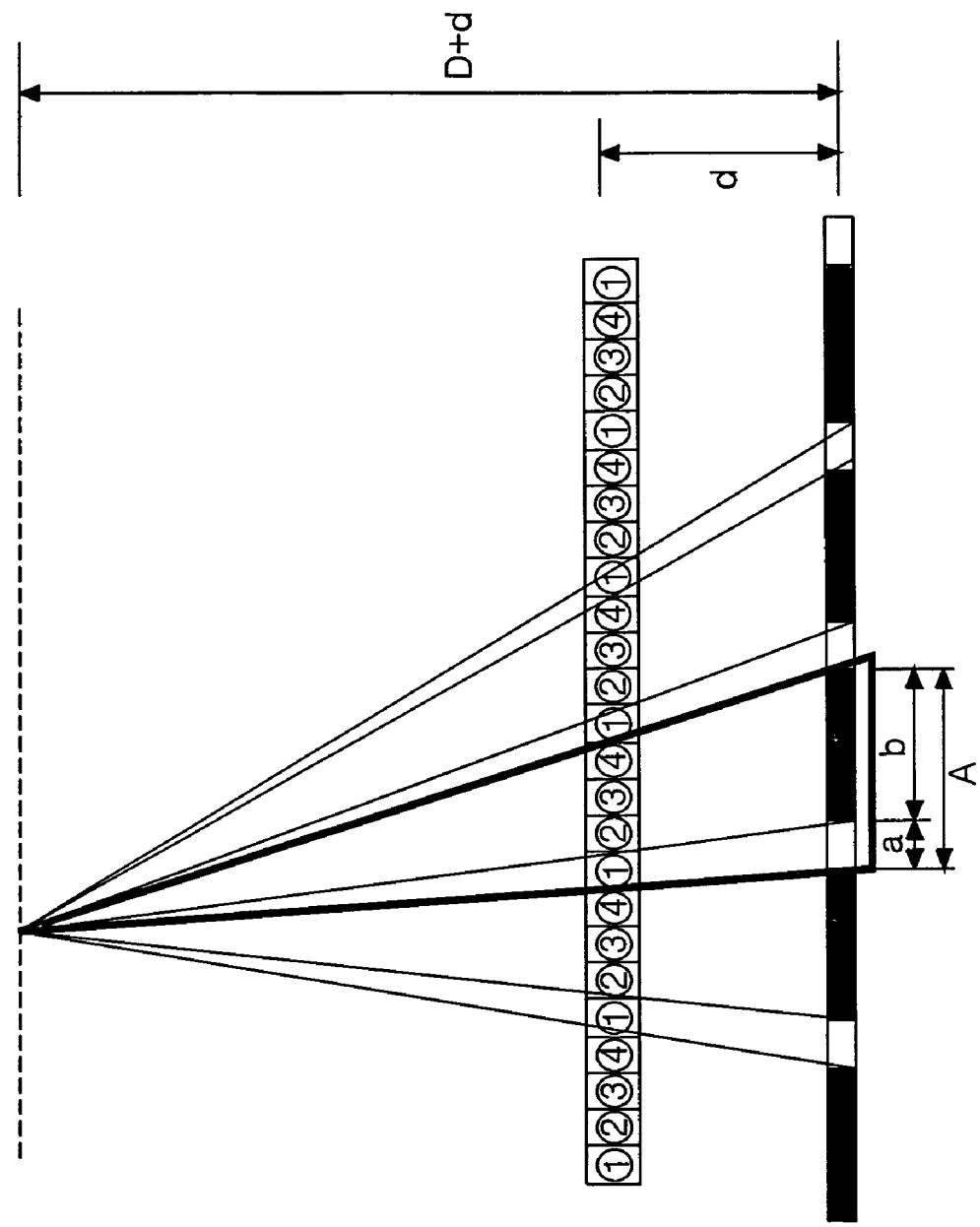
FIGS. 5 and 6 are a view illustrating multi-view display device according to an embodiment of the present invention.
Figure 6:
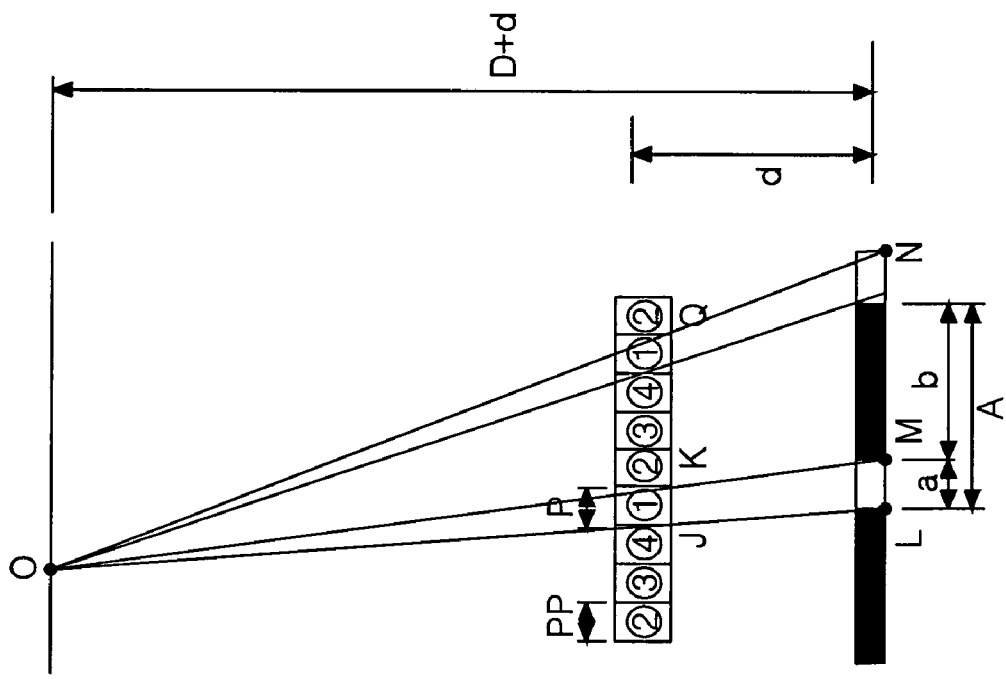

Referring to FIG. 5 and FIG. 6, the three-dimensional image display device according to the embodiment of the present invention adequately designs a parameter such as a light shielding part length (b) that the guides 11 and 51 are occupied at the parallax barriers 1 and 41, a light transmitting part length (a) between the guides 11 and 51, one pitch (A) of the parallax barriers 1 and 41 that the light transmitting part and the light shielding part are added to each other, a distance (d) between the liquid crystal display device 2 and the parallax barriers 1 and 41, and a distance (D+d) between the parallax barriers 1 and 41 and the observer, etc., to be implemented in a multi-view system. The number of images is adjusted if the parameters are adjusted at the multi-view system. In this case, the observer can observe the images. FIG. 5 represents an example of a four-view system that the observer can observe four-number images in accordance with the observer's location (①) to ④). The observer observes R, G and B sub-pixels. Herein, the R, G and B sub-pixels are displayed as '①' at a first location ①, the R, G and B sub-pixels are displayed as '②' at a first location ②, the R, G and B sub-pixels are displayed as '③' at a first location ③, and the R, G and B sub-pixels are displayed as '④' at a first location ④, respectively.

Hereinafter, an optimized design of a light shielding part length 'b' and a light transmitting part length (a) implementing the multi-view system using the parameters as variables will be described with reference to FIG. 5 and FIG. 6.

Referring to FIG. 5 and FIG. 6, it is assumed that a first location (①) of the observer represents '0', the leftmost point of an arbitrary (n)th (n is a positive integer) light transmitting part observed at the first location (①) of the observer represents 'L', the rightmost point of the (n)th light transmitting part observed at the first location (①) of the observer represents 'M', and the rightmost point of the (n+1)th light transmitting part observed at the first location (①) of the observer represents 'N'.

A triangle 'ΔOLM' and a triangle 'ΔOJK' are similar to each other. Herein, the triangle 'ΔOLM' is comprised of a location '0' of the observer and 'LM' of the parallax barriers 1 and 41, and the triangle 'ΔOJK' is comprised of a location '0' of the observer and a sub-pixel length 'JK' of the liquid crystal display device. Similarly, a triangle 'ΔOLN' and a triangle 'ΔOJQ' are similar to each other. Herein, the triangle 'ΔOLN' is comprised of a location '0' of the observer and 'LN' of the parallax barriers 1 and 41, and the triangle 'ΔOJQ' is comprised of a location '0' of the observer and a sub-pixel length 'JQ' of the liquid crystal display device. Accordingly, the following mathematical formula 3 and 4 are defined.

$$\Delta OLM \propto \Delta OJK \quad \text{[Mathematical Formula 3]}$$
$$\frac{D+d}{a} = \frac{D}{P}$$

$$\Delta OLN \propto \Delta OJQ \quad \text{[Mathematical Formula 4]}$$
$$\frac{D+d}{A} = \frac{D}{JQ}$$

In the above formula 4, $$\overline{JQ} = \frac{AD}{D+d}, \text{ and } \overline{JQ} = (N+1)\overline{JK}$$

in case of a N view system. $\overline{JQ}=5\overline{JK}$ if a value of 'N' is 4 as shown in FIG. 5.

In order to separating a display image, a value of a is defined as shown in mathematical formula 5, and a value of A is defined as shown in mathematical formula 6 if P is substituted for $\overline{JQ}$, i.e., $\overline{JQ}=5$ P.

$$A = \frac{5P(D+d)}{D} \quad \text{[Mathematical Formula 5]}$$

$$a = \frac{P(D+d)}{D} \quad \text{[Mathematical Formula 6]}$$

Accordingly, in case of four-view system, a length of one pitch to which the light shielding part and the light transmitting part are added is defined as A=5a, and a length of the light shielding part is defined as b=4a at the parallax barriers 1 and 41.

As described above, the light guide, the image display device and method for generating image according an embodiment of the present invention includes a guide having a substantially a triangular cross-section of the guide to direct light to be incident on the surface of the light guide. A side surface of the guide may be at an angle such that light incident on guide is totally reflected. Alternative a reflective layer may be formed on the guide to direct the light towards the surface of the parallax barrier. Embodiments of the present invention may be employed to minimize the reduction in the intensity of the light progressing to the liquid crystal display device from the backlight unit by the parallax barrier. Furthermore, a three-dimensional image display according to the embodiment of the present invention adjusts a distance between a display and a parallax barrier, and a distance between guides at the parallax barrier to implement a N view system that is capable of observing N number of three-dimensional images in accordance with an observer's location.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A light guide comprising:
   a transparent substrate having an incidence surface and a transmitting surface;
   a plurality of guide members each having a guide base formed on the incidence surface of the transparent substrate, the guide bases being separated by an open area on the incidence surface of the transparent substrate having a width "a", and each guide base overlapping an area on the incidence surface of the transparent substrate having a width "b",
   wherein facing sides of adjacent guides each form an obtuse angle with the incidence surface of the transparent substrate,
   wherein the ratio "b" divided by "a" is equal to N where N is an integer greater than 2, and
   wherein each of the incidence surface and the transmitting surface of the transparent substrate is flat.

2. The light guide according to claim 1, wherein each of the guides has a tapered cross section having a width widest near the incidence surface of the transparent substrate.

3. The light guide according to claim 1, wherein a side surface of each guide is disposed at an angle to the incidence surface to induce a total reflection condition on light incident on the side surface of the guide.

4. The light guide according to claim 1, further comprising: a reflection layer formed on a side surface of each guide.

5. The light guide according to claim 1, wherein the incidence surface of the transparent substrate is exposed between the guides.

6. A image display device, comprising:
   a display unit;
   a backlight unit to irradiate light for displaying images; and
   an optical guide including:
   a transparent substrate having a first surface and a second surface;
   a plurality of guide members each having a guide base formed on the first surface of the transparent substrate, the guide bases separated by an open area on the first surface of the transparent substrate having a width "a", and each guide base overlapping an area on the first surface of the transparent substrate having a width "b", wherein the ratio "b" divided by "a" is equal to N where N is an integer greater than 2, wherein a side surface of each guide member is disposed at an angle to the first surface of the transparent substrate to induce a total reflection condition on the majority of light incident onto the side surface of the guide member from the backlight, and wherein each of the first surface and the second surface of the transparent substrate is flat.

7. A multiple image display device, comprising:
a display unit for displaying images;
a backlight unit; and
an optical guide including:
a transparent substrate having an incidence surface and a transmitting surface;
a plurality of guide members each having a guide base formed on the incidence surface of the transparent substrate, the guide bases separated by an open area on the incidence surface of the first surface having a width "a", and each guide base overlapping an area on the incidence surface of the transparent substrate having a width
wherein facing sides of adjacent guides each form an obtuse plane angle with the incidence surface of the transparent substrate,
wherein the ratio "b" divided by "a" is equal to N where N is an integer greater than 2, and
wherein the incidence surface is flat.

8. The multiple image display device according to claim 7, wherein each of the guides has a tapered cross section having a width widest near the incidence surface.

9. The multiple image display device according to claim 7, wherein a side surface of each guide is disposed at an angle to the incidence surface to induce a total reflection condition on most of the light incident on the side surface of the guide.

10. The multiple image display device according to claim 7, further comprising:
a reflection layer formed on a side surface of each guide to reflect light to the incidence surface.

11. The multiple image display device according to claim 7, wherein the guide member includes:
a transparent substrate having a flat incidence surface disposed facing the backlight and a flat transmitting surface and having the guides are formed on the incidence surface.

12. The multiple image display device according to claim 11, wherein the flat incidence surface of the transparent substrate is exposed between the guides.

13. A method for generating images comprising:
providing a multiple image display device, comprising:
a backlight unit; and
an optical guide including;
a plurality of guide members each having a guide base formed on a incidence surface of a transparent substrate, the guide bases being separated by an open area on the incidence surface of the transparent substrate having a width "a", and each guide base overlapping an area on the incidence surface of the transparent substrate having a width "b", wherein facing sides of adjacent guides each form an obtuse angle with the incidence surface of the transparent substrate and, wherein the ratio "b" divided by "a" is equal to N where N is an integer greater than 2;
driving image pixels of a display with image data for multiple images using an image pitch of N;
reflecting light emitted the backlight unit from a guide member of the plurality of guide members onto the incidence surface of the transparent substrate; and
directing the reflected light onto the display device.

14. The method for generating images according to claim 13, wherein each of the guides has a tapered cross section having a width widest near the incidence surface.

15. The method for generating images according to claim 13, wherein the incidence surface is flat.

16. The method for generating images according to claim 13, wherein a side surface of each guide is disposed at an angle to produce a total reflection condition on most of the light incident on the side surface of each guide from the backlight unit.

17. The method for generating images according to claim 13, wherein the guide member further comprises:
a reflection layer formed on a side surface of each guide.

18. The method for generating images according to claim 13, wherein the incidence surface is exposed between the guides.

* * * * *